Sept. 1, 1925.

G. W. BRUCE

POTATO DIGGER

Filed Nov. 3, 1924

1,551,795

2 Sheets-Sheet 1

INVENTOR:
George W. Bruce
BY David E. Carlsen
ATTORNEY.

Patented Sept. 1, 1925.

1,551,795

UNITED STATES PATENT OFFICE.

GEORGE W. BRUCE, OF OSSEO, MINNESOTA.

POTATO DIGGER.

Application filed November 3, 1924. Serial No. 747,467.

*To all whom it may concern:*

Be it known that I, GEORGE W. BRUCE, a citizen of the United States, residing at Osseo, in the county of Hennepin and State of Minnesota, have invented certain new and useful Improvements in Potato Diggers, of which the following is a specification.

My invention relates to improvements in potato diggers and the object is to provide a simple and efficient digger of such construction that the potatoes may be dropped on the ground, after the usual elevating process and separation from the vines, either in certain quantities or in continuous rows as may be desired and according to the condition of the soil and the vines.

Figure 1:
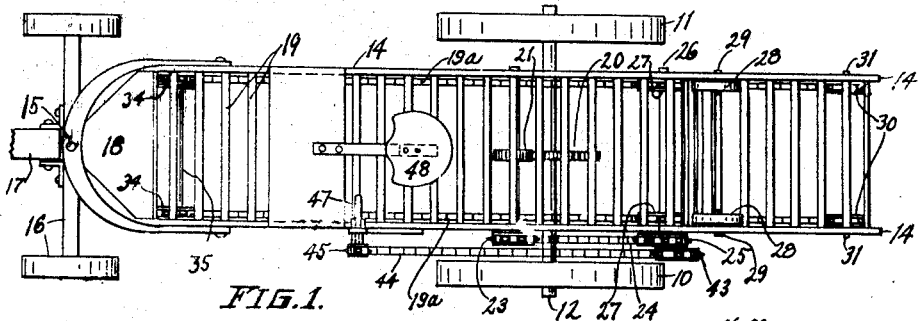
Figure 2:
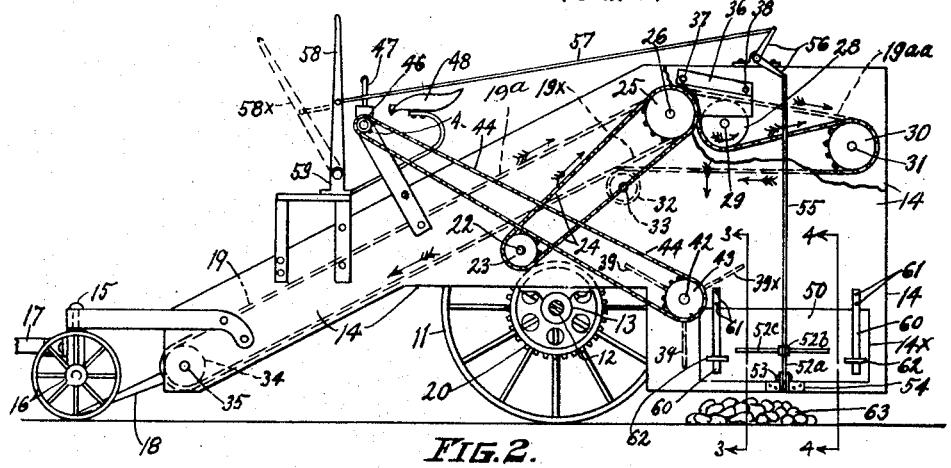
Figures 3, 4, 5, 6:
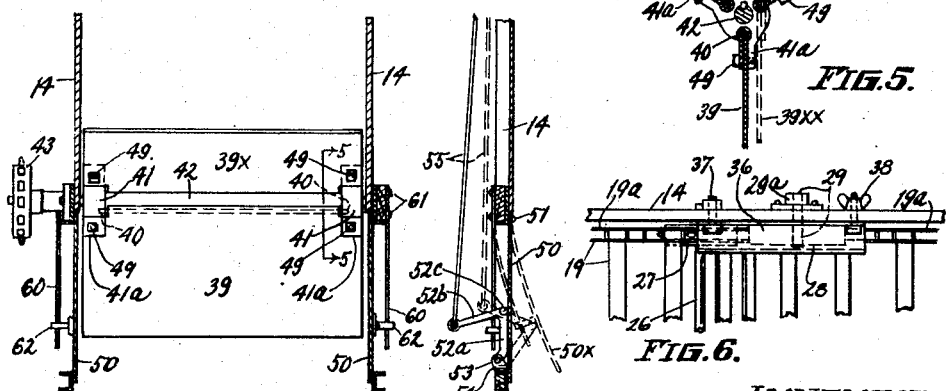
Figure 7:
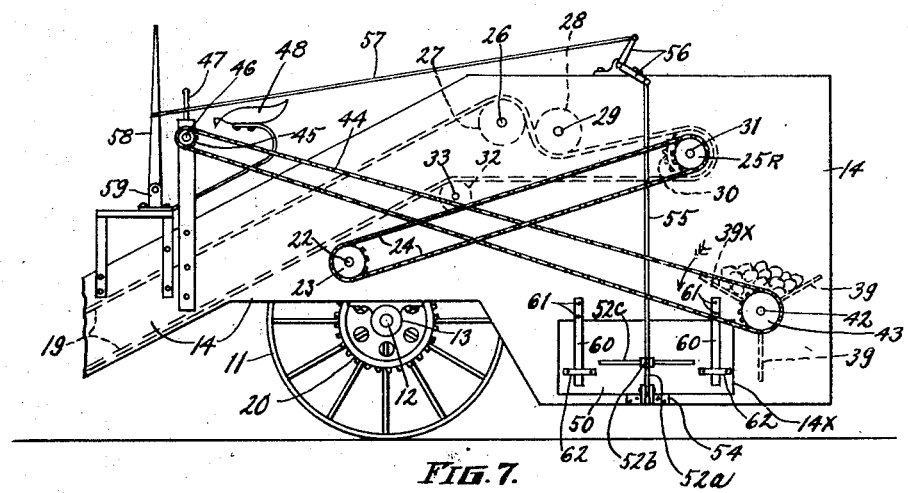

In the accompanying drawings:

Fig. 1 is a top view of the improved machine with some minor parts omitted. Fig. 2 is a side elevation of Fig. 1 with a portion of the left side wall broken away and the minor parts added which do not appear in Fig. 1, the left side drive wheel being also omitted. Fig. 3 is an enlarged sectional elevation on line 3—3 in Fig. 2. Fig. 4 is an enlarged sectional view as on line 4—4 in Fig. 2. Fig. 5 is an enlarged sectional view of the revolving hopper of my device, as on line 5—5 in Fig. 3. Fig. 6 is an enlarged fragmentary top view of the gear shield 36 in Fig. 2 and adjacent parts. Fig. 7 is Fig. 2 modified and omitting the front wheel truck and the hopper being located at the extreme rear end of the frame.

Referring to the drawing by reference numerals 10 and 11 designate respectively the main left and right supporting wheels on the axle 12. The axle is journaled in bearings 13 (Fig. 2) of the main frame 14. The front end of the main frame is pivotally supported at 15 by a wheel truck 16 to which is suitably secured a draft pole 17.

18 is the usual digging shovel adjacent the front wheel truck and from which potatoes and their vines are elevated by an inclined elevator 19 and the upper run of which is moved rearwardly from the shovel by the rotation of the ground wheels 10—11, the main axle 12 carrying a gear 20 rotating a pinion 21 on a horizontal shaft 22 journaled in the side walls of the frame 14. Outside of the left wall as in Fig. 2 the shaft 22 carries a sprocket 23 engaging a chain 24 which rotates a sprocket 25 (Figs. 1 and 2) or 25$^R$ (Fig. 7) mounted on a shaft 26 or shaft 31 respectively journaled in the frame 14 in elevated position. Said shaft 26 (Figs. 1 and 2) has two spaced sprockets 27 each engaging one of the chains 19$^a$ of the elevator (see also Fig. 6). Said elevator is of the usual type having spaced transverse bars to carry the potatoes and vines rearwardly and upwardly the spaces between the bars allowing soil to drop off of the potatoes to the ground. At the top of the incline the conveyor belt 19 runs over two sprockets 27 and from thence its direction is downwardly in approximately a vertical drop, thence engaging the under side of two rollers 28 mounted each on a stub shaft 29 suitably secured as in a block 29$^a$ (Fig. 6) on the adjacent frame wall. This abrupt drop of the conveyor causes the potatoes and vines to become separated and also jars loose any dirt adhering to the potatoes up to this point. The conveyor is continued rearwardly from the lower sides of the rollers 28 to and over a pair of rear sprockets 30 mounted on a shaft 31, journaled in the frame, where the potatoes are dropped off. From the latter sprockets 30 the conveyor is extended forwardly to a pair of idler sprockets or rollers 32 (see Figs. 2 and 7) on a shaft 33. From thence the conveyor continues forwardly to the under side of the front sprockets 34 on a shaft 35, adjacent the scoop 18, where the upward travel of the conveyor begins. In a preferred form of the device, as Fig. 7, the conveyor driving sprocket is designated as 25$^R$, keyed on the shaft 31 and is driven by the chain 24. In this form of the device 27—28 may all be plain rollers.

36 is a sheet metal guard having a vertical flange adapted to be secured to the frame wall 14 by a pivot bolt 37 and also a thumb screw 38 (see Figs. 2 and 6) the shield or guard part extending inwardly and thence downwardly from a point about vertically above shaft 26 to a point just above shaft 29 to prevent potatoes etc., from clogging between the sprockets 26 and rollers 28.

The construction and operation of my device so far disclosed it is apparent are particularly useful for potato harvesting where the soil is moist and adheres to the potatoes and also when the vines are not sufficiently dried to readily separate from the potatoes. Under other conditions, however, as when the soil is dry and the vines withered to such an extent that they readily separate from the potatoes it is apparent that the potatoes need not be carried further than over the rollers 26. For this condition I may provide a rotary hopper under sprockets 26 to catch the potatoes dropping from the conveyor, the latter being in this case shortened by removing a number of its links and bars and making the lower run of it extend directly forward to the sprockets 34, as 19× in Fig. 2. The rotary hopper comprises preferably three radially arranged blades 39 spaced equidistant and each hingedly connected at its opposite inner ends as at 40 in a hub 41 (Fig. 5) secured on a horizontal shaft 42 journaled in the frame, one end of said shaft carrying a sprocket 43, externally of the frame, and said sprocket rotated by a chain 44 and another sprocket 45 on a shaft 46 turned by a hand crank 47 mounted adjacent the driver's seat 48. The driver can operate said crank until two adjacent blades 39 are extended upwardly between the walls of frame 14 thus forming a receiving hopper for potatoes dropped from the conveyor. When the hopper is full the operator merely turns crank 47, rotating the hopper a third of a revolution and dropping the potatoes on the ground, as at 63 in Fig. 2, and the next two adjacent blades 39 are then in hopper forming position. Each of the hubs 41 has an ear or extension 41ª (Fig. 5) for each blade 39, said ear threaded to receive a screw 49 passed through an aperture in a blade 39 to hold the latter in proper radial relation. If the operator desires to not use the hopper he simply removes the screw 49 in the upwardly extending blade 39 which is in the path of the falling potatoes, as blade 39× in Figs. 5 and 7, and said blade being thus released hangs down in position 39×× thus allowing the potatoes to drop directly on the ground. When the potatoes fall directly on the ground they are likely to be scattered promiscuously but to prevent this I have provided a guide plate 50 in each side wall of frame 14 and adjacent the hopper. This plate 50 is preferably sheet metal and of a form to cover the inner side of a rectangular opening 14× in the frame wall (Figs. 2 and 7). The upper edge of the plate is secured as at 51 (Fig. 4) to the frame and its main body is adapted to be swung inwardly toward the center of the machine, the two opposite plates thus forming guiding means forcing the falling potatoes to fall toward the center (see dotted lines 50× in Fig. 4). The means for springing each plate 50 inwardly comprise a vertically disposed bell crank with one vertical arm 52ª contacting with the plate and its lower end pivotally secured as at 53 to a bracket 54 secured on the frame wall at the lower central part of the aperture 14×.

The other arm 52ᵇ extends outwardly horizontally from the arm 52ª and its outer end is engaged by a rod or other pulling means 55 extending upwardly to another bell crank 56 pivoted on a transverse horizontal shaft mounted on the upper part of frame 14 (see Fig. 2). The latter crank is rocked by another pulling rod 57 the front end of which is connected to a lever 58 pivoted in a bracket 59 near the driver's seat (see Fig. 2). Thus when the driver pushes lever 58 ahead to position 58× the bell crank 52ª⁻ᵇ is swung on its pivot 53 causing arm 52ª to be sprung inwardly and pushing the plate 50 toward the center of the machine. 52ᶜ is a horizontal arm at right angles to the plane of lever 52ª—52ᵇ and fixed on the latter and engages plate 50 to swing the latter out of its vertical plane (see Figs. 2 and 4). 60 are a number of suitable vertically arranged, elongated spring leaves fixed as at 61 above the aperture 14× and each slidably engaging a bracket 62 fixed on the outer side of the plate 50 to spring said plate back to its normal vertical position and hold it there when the plate springing means are not in use.

When neither the hopper nor the guide plates are to be used and the operator desires to have the potatoes dumped off at the extreme rear end and without passing the conveyor belt 19 under the rollers, the operator may remove the shields 36 or swing them up on their pivots 37, and then pass the upper run of the conveyor directly from the rollers 27 back to the rollers 30. The chains 19ª will then extend rearwardly about as indicated in dotted lines 19ªª in Fig. 2 and may engage the upper side of the rollers 28.

The operation of my improved machine has been fully disclosed but it might be further stated briefly that I have provided means in one machine for harvesting potatoes and handling them in various ways according to local conditions at the time of harvesting such as the condition of the soil and of the vines and the potatoes.

An important feature also is the single continuous elevator belt or apron 19 having the drop between the sprockets 27 and rollers 28 for the purpose described.

What I claim is:

1. In a potato harvester having an elongated frame supported on a forward wheel truck and two rear wheels, a single endless apron in said frame and extending from a point near the forward truck upwardly and rearwardly over the rear wheels, means operatively connecting said drive wheels with the apron to move the upper run of the latter rearwardly when the harvester is in motion, a pair of sprocket wheels rotatably mounted in the top portion of the frame, another pair of sprocket wheels rotatably mounted in the extreme rear part of the frame, a pair of rollers rotatably mounted in alinement with said first pair of sprocket wheels and rearward thereof; said apron extensible to terminate with its rear end at said highest pair of sprockets or at the sprockets in the rear end of the frame, to drop potatoes selectively, from said highest point or from the rear end of the frame; a rotatable hopper mounted within the frame and below the rear end of the conveyor to receive potatoes dropped therefrom and means for partially rotating said hopper to dump the potatoes on the ground, means for making said hopper inoperative and to allow the potatoes to drop directly on the ground and means to guide the falling potatoes toward the center of the frame and on the ground rearwardly of the ground wheels.

2. The structure specified in claim 1 and a guard secured above said uppermost sprockets and the rollers adjacent thereto to prevent potatoes, vines or soil from being crushed.

3. The structure specified in claim 1, in which the upper run of the apron is moved rearwardly by said highest sprockets, thence downwardly under said rollers, thence rearwardly from the lower side of the rollers to the extreme rear sprockets, for the purpose set forth.

4. The structure specified in claim 1 in which the upper run of the apron terminates at the highest pair of sprockets and said hopper comprises a rotatable shaft mounted horizontally and transversely in the frame, a number of hinged plates extending radially from said shaft and adapted to be fixed in said radial relation to the shaft, either of said plates adapted, when positioned, to extend rearwardly and upwardly in the path of potatoes being dropped from the apron, to catch the potatoes in the hopper formed between said plate and the adjacent forwardly extending plate; and means for dropping said plates downwardly out of the path of the falling potatoes.

5. The structure specified in claim 1, in which said guiding means for the falling potatoes comprise longitudinally arranged vertically disposed plates each having its upper edge fixed on a side wall of the frame, means tending to hold each plate in a vertical plane and means for springing the main part of the plate inwardly toward the center of the frame to form an inclined guard.

6. The structure specified in claim 1, in which said guiding means for the falling potatoes comprise longitudinally arranged vertically disposed plates each having its upper edge fixed on a side wall of the frame, means tending to hold each plate in a vertical plane and means for springing the main part of the plate inwardly toward the center of the frame, said springing means comprising for each guide plate a knee brace with a vertical arm pivotally secured with its lower end to the frame and normally in contact with the plate, a horizontal arm extending outwardly from the vertical arm, means for pulling said horizontal arm upwardly to swing the knee brace inwardly and press the plate, and horizontal arms on said knee brace to engage the outer face of the plate.

In testimony whereof I affix my signature.

GEORGE W. BRUCE.